US012459014B2

(12) United States Patent
Lantz

(10) Patent No.: US 12,459,014 B2
(45) Date of Patent: Nov. 4, 2025

(54) NOZZLE FOR CLEANING THE INTERIOR OF A PIPE, A SYSTEM INCLUDING SUCH A NOZZLE AND A METHOD FOR CLEANING THE INTERIOR OF A PIPE

(71) Applicant: AquaTeq Sweden AB, Kalmar (SE)

(72) Inventor: Anna Lantz, Ljungbyholm (SE)

(73) Assignee: AquaTeq Sweden AB, Kalmar (SE)

( * ) Notice: Subject to any disclaimer, the term of this patent is extended or adjusted under 35 U.S.C. 154(b) by 0 days.

(21) Appl. No.: 17/767,836

(22) PCT Filed: Oct. 9, 2019

(86) PCT No.: PCT/EP2019/077386
§ 371 (c)(1),
(2) Date: Apr. 8, 2022

(87) PCT Pub. No.: WO2021/069072
PCT Pub. Date: Apr. 15, 2021

(65) Prior Publication Data
US 2023/0114645 A1 Apr. 13, 2023

(51) Int. Cl.
*B08B 9/049* (2006.01)

(52) U.S. Cl.
CPC ........ *B08B 9/0495* (2013.01); *B08B 2209/04* (2013.01)

(58) Field of Classification Search
CPC ....... B08B 9/0495; B08B 2209/04; E03F 9/00
See application file for complete search history.

(56) References Cited

U.S. PATENT DOCUMENTS 3,678,948 A * 7/1972 Hedges ................. B08B 9/0495 134/167 C
5,626,684 A * 5/1997 Rodarte ................ B08B 9/0433 134/22.12
2009/0071513 A1* 3/2009 Larsson ................ B08B 9/0495 134/167 C
2013/0167884 A1* 7/2013 Steinicke .................. E03F 9/00 134/166 C (Continued)

FOREIGN PATENT DOCUMENTS

CN 103037990 A 4/2013
DE 19915413 A1 * 11/1999 ........... B08B 9/0495

(Continued)

OTHER PUBLICATIONS

Machine translation of DE19915413A1 (Year: 1999).*

(Continued)

*Primary Examiner* — Douglas Lee
(74) *Attorney, Agent, or Firm* — Brooks Kushman P.C.

(57) ABSTRACT

A method and system having nozzle for cleaning the interior of a pipe is provided. The nozzle has a rinsing fluid inlet and a plurality of rinsing fluid discharges, wherein each of the rinsing fluid discharges is arranged for discharging fluid substantially in a rearward direction. The nozzle has a plurality of rinsing fluid outlets for discharging rinsing fluid substantially in the rearward direction. Each of the rinsing fluid outlets is enclosed by a tube forming a passage between the tube and the rinsing fluid outlet. Each tube is connected to a material suction inlet and comprises a tube outlet for discharging a mixture of material and rinsing fluid.

17 Claims, 8 Drawing Sheets

(56) References Cited

U.S. PATENT DOCUMENTS

Figure 1:
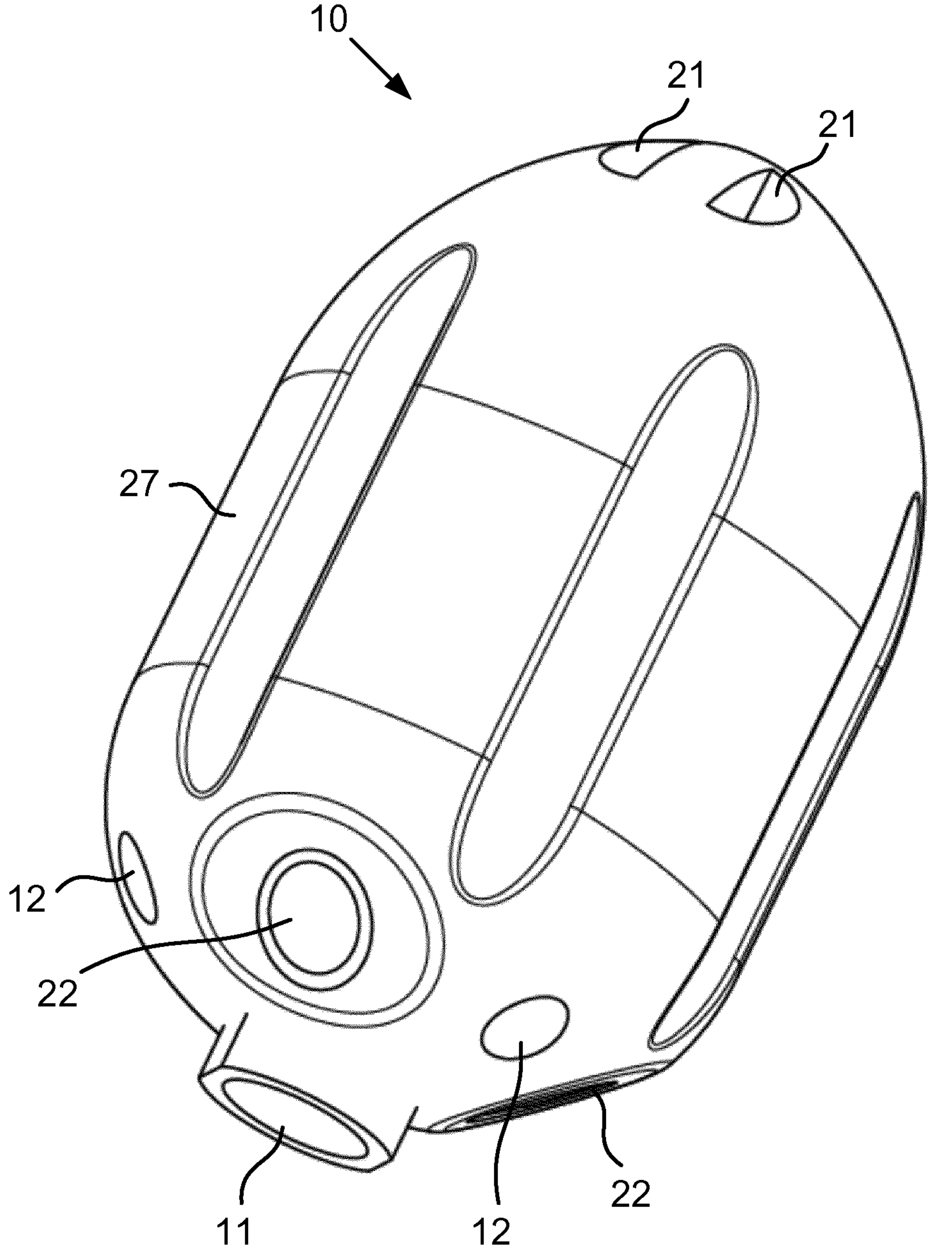

2014/0150894 A1* 6/2014 Zink .................. F16K 31/1635
137/238

FOREIGN PATENT DOCUMENTS

| | | | | | |
|---|---|---|---|---|---|
| DE | 102010044953 | A1 | | 3/2012 | |
| EP | 2033719 | A2 | | 3/2009 | |
| EP | 2279802 | A1 | | 2/2011 | |
| SU | 1011803 | A | * | 4/1983 | ........... B08B 9/0495 |

OTHER PUBLICATIONS

Machine translation of SU1011803A (Year: 1983).*
International Search Report and Written Opinion for Application No. PCT/EP2019/077386, mailed Jul. 10, 2020, 8 pages.
First Office Action for Chinese Application No. 201980101079.8, dated Jan. 27, 2024, 22 Pages.

* cited by examiner

NOZZLE FOR CLEANING THE INTERIOR OF A PIPE, A SYSTEM INCLUDING SUCH A NOZZLE AND A METHOD FOR CLEANING THE INTERIOR OF A PIPE

CROSS-REFERENCE TO RELATED APPLICATION

This application is the U.S. national phase of International Application No. PCT/EP2019/077386 filed on Oct. 9, 2019, the disclosure of which is incorporated in its entirety by reference herein.

FIELD OF THE INVENTION

The present invention relates to a nozzle. More specifically the present invention relates to a nozzle for cleaning the interior of a pipe by means of rinsing fluid, such as water, wherein the nozzle comprises a forward end, arear end, a centre axis extending between the front and rear ends, a rinsing fluid inlet and a plurality of rinsing fluid discharges, wherein the rinsing fluid inlet is arranged for introducing rinsing fluid into the nozzle in a forward direction and wherein each of the rinsing fluid discharges is arranged for discharging fluid in a direction at least partially being in a rearward direction.

This type of nozzles is used for cleaning the interior of pipes, such as pipes for storm water, surface water, waste water, sewage water, industrial waste water and similar. This type of nozzles is commonly used for cleaning a pipe connecting two manholes in a pipe system having manholes.

The present invention also relates to a system for cleaning the interior of pipes, and also a method for cleaning the interior of pipes by means of such a nozzle.

PRIOR ART

A plurality of nozzles for cleaning the interior of pipes, such as sewage pipes, is disclosed in the prior art. One type of such nozzles is described in EP2033719. EP2033719 discloses a hydrodynamic nozzle for rinsing the interior of a pipe, comprising a forward end, a rear end, a rinsing water inlet arranged in the rear end, internal rinsing water channels redirecting rinsing water from the inlet to a plurality of rinsing water discharges in the rear end of the nozzle. The nozzle of EP2033719 also includes through air passages having air intakes in the forward end and air discharges in the rear end of the nozzle.

Even though the nozzle of EP2033719 has many advantages in relation to other prior art, it is desirable to further improve the cleaning capability of such nozzles for cleaning the interior of pipes, such as pipes for storm water, waste water, sewage water and similar.

Hence, one problem of such prior art nozzles is that the suction efficiency can be low.

Another problem with such prior art nozzles is that they can get stuck in material inside the pipe.

BRIEF DESCRIPTION OF THE INVENTION

One object of the present invention is to overcome or at least alleviate the above-mentioned problems and provide a more efficient and reliable nozzle for cleaning the interior of pipes, such as pipes for storm water, waste water, sewage water and similar.

The present invention relates to a nozzle for cleaning the interior of a pipe, comprising a forward end, a rear end, a centre axis extending between the front and rear ends, a rinsing fluid inlet and a plurality of rinsing fluid discharges, wherein the rinsing fluid inlet is arranged for introducing rinsing fluid into the nozzle in a forward direction and wherein each of the rinsing fluid discharges is arranged for discharging fluid in a direction at least partially being in a rearward direction, characterised in that the nozzle further comprises a plurality of rinsing fluid outlets for discharging rinsing fluid in a direction at least partially being in the rearward direction, wherein each of the rinsing fluid outlets is enclosed by a tube forming a passage between the tube and the rinsing fluid outlet, and wherein each tube is connected to a material suction inlet and comprises a tube outlet for discharging material and rinsing fluid. The rinsing fluid outlets, the material suction inlets and the tubes surrounding the rinsing fluid outlets result in an ejector function which can draw fluids and/or material located in front of the nozzle into and through the nozzle, wherein said fluids and/or material are discharged in the backward direction through the tube outlets. Simultaneously, the rinsing fluid discharges makes it possible to efficiently propel the nozzle in the forward direction inside the pipe while cleaning the interior surface of the pipe, e.g. by rinsing fluid jets discharged through the rinsing fluid discharges. The combination of the cleaning and propelling possibilities by the rinsing fluid discharges and the ejector functions achieved by the rinsing fluid outlets and tubes result in an efficient and reliable nozzle for cleaning the interior of pipes, particularly when the nozzle, or at least one of the tubes thereof, is immersed in fluid and/or material inside the pipe.

The rinsing fluid discharges, the rinsing fluid outlets and the tube outlets can be arranged radially outside the rinsing fluid inlet. The rinsing fluid discharges and the tube outlets can be distributed around the rinsing fluid inlet and can be arranged in an alternating manner, so that the discharged fluids and material, and thereby the propelling of the nozzle, is balanced. Also, distributing the rinsing fluid discharges and the tube outlets around the rinsing fluid inlets makes it possible to achieve a central rinsing fluid inlet fora more even distribution of rinsing fluid throughout the nozzle. Alternatively, the rinsing fluid discharges and the rinsing fluid outlets can be arranged radially outside the rinsing fluid inlet substantially in a common plane to form a flat nozzle. Alternatively, the rinsing fluid discharges and the rinsing fluid outlets can be arranged radially outside the rinsing fluid inlet in any desired manner or pattern.

The rinsing fluid discharges can be axially displaced in relation to the rinsing fluid outlets, wherein the rinsing fluid discharges can be arranged further backward than the rinsing fluid outlets and hence the cleaning function by the jets through the rinsing fluid discharges can be balanced with the ejector functions through the rinsing fluid outlets in an efficient manner.

The tubes can comprise a first tube section and a second tube section, wherein the rinsing fluid outlet can be arranged inside the first tube section to form a chamber inside the first tube section for material, i.e. material entering the tube through the material suction inlet, and rinsing fluid, wherein the material and rinsing fluid, which may be mixed or not inside the chamber, efficiently are discharged through the tube outlet. The first tube section can be wider than the second tube section to achieve an efficient ejector function.

The nozzle can comprise a forward rinsing fluid discharge for discharging rinsing fluid in the forward direction, wherein blockages in front of the nozzle, such as by waste material, can be opened up. Hence, material in front of the nozzle can be dispersed, dissolved or mixed in the rinsing fluid for further transport in the backward direction, either through the nozzle via the material suction inlets or by the rinsing fluid jets from the rinsing fluid discharges. The combination of the rinsing fluid discharges, the rinsing fluid outlets inside the tubes and the forward rinsing fluid discharge has proven to result in a very efficient nozzle for cleaning pipes.

Disclosed is also a system for cleaning the interior of a pipe, comprising a water source, a hose, a pump and a nozzle according to the present invention, wherein the nozzle is connected to the water source through the hose and the pump for cleaning the pipe by means of pressurized rinsing fluid.

Disclosed is also a method for cleaning the interior of a pipe, comprising the steps of a) introducing a nozzle having a forward end, a rear end and a centre axis into the pipe,
b) conducting a rinsing fluid to a rinsing fluid inlet in a rear end of the nozzle,
c) conducting rinsing fluid from the rinsing fluid inlet to rinsing fluid discharges directed substantially backward for rinsing the interior of the pipe while driving the nozzle forward inside the pipe,
d) conducting rinsing fluid from the rinsing fluid inlet to rinsing fluid outlets directed substantially backward and thereby sucking material inside the pipe into tubes of the nozzle through material suction inlets in the nozzle and further into passages between the tubes and the rinsing fluid outlets,
e) following step d) discharging the material and rinsing fluid through a tube outlet.

Further characteristics and advantages of the present invention will become apparent from the description of the embodiments below, the appended drawings and the dependent claims.

SHORT DESCRIPTION OF THE DRAWINGS

Figure 2:
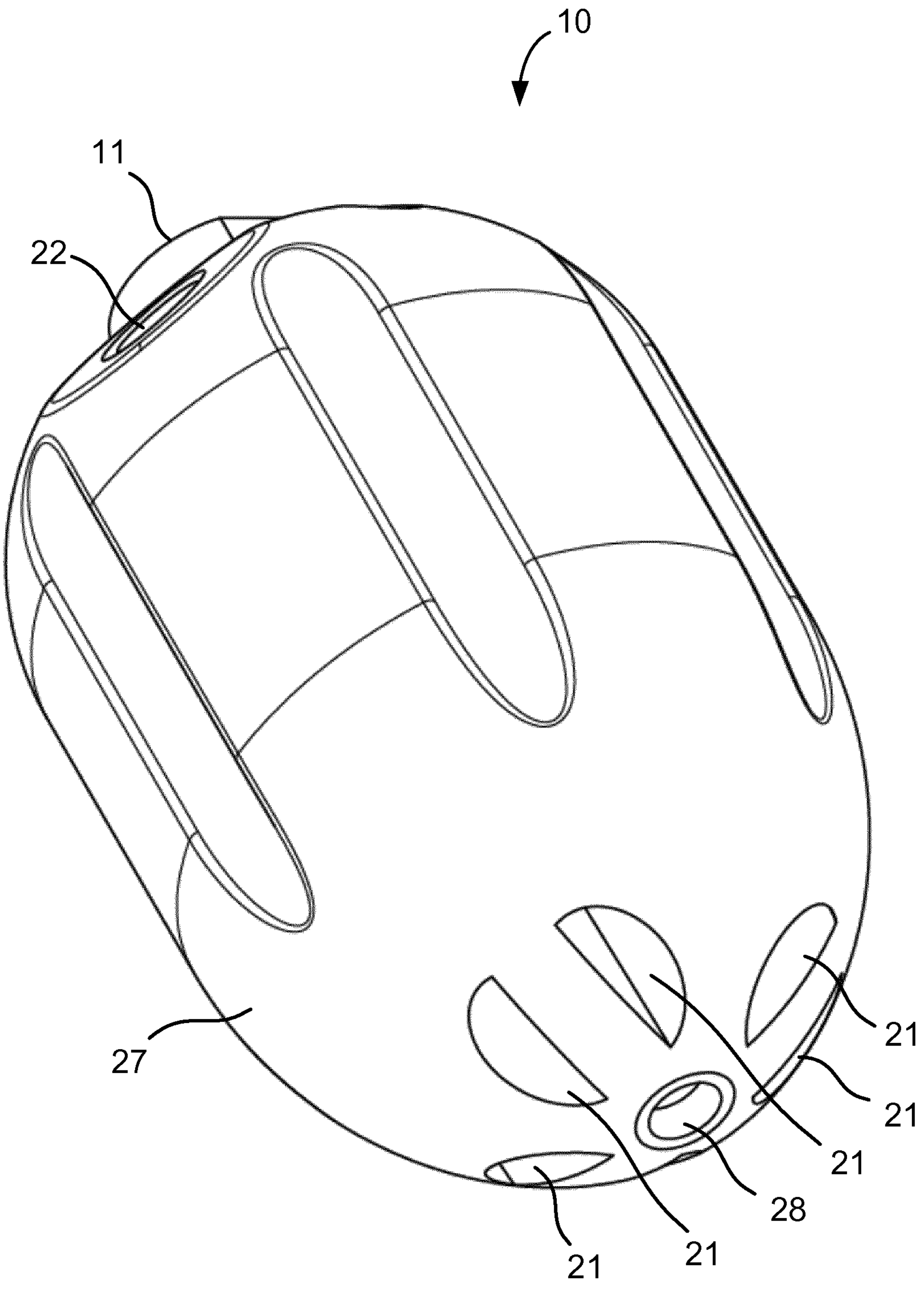
Figure 3:
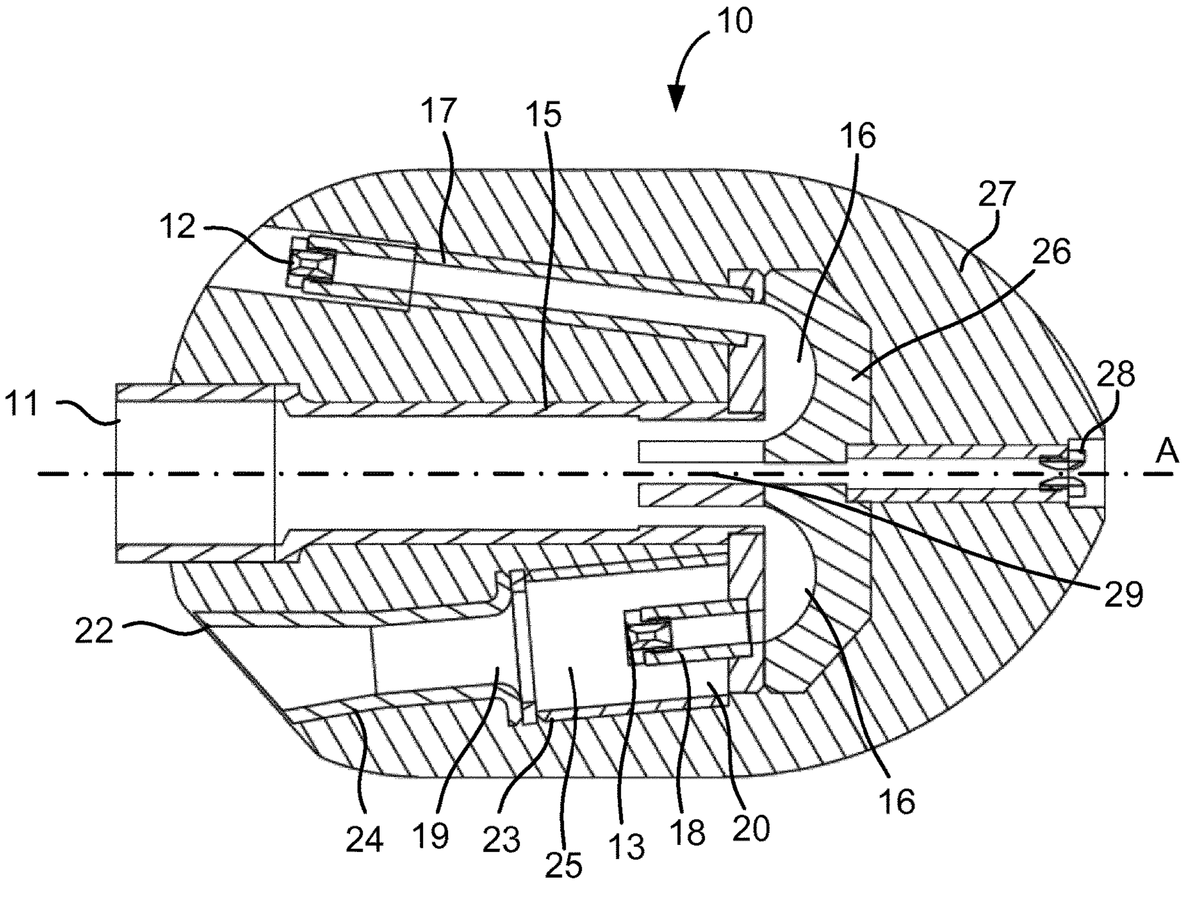
Figure 4:
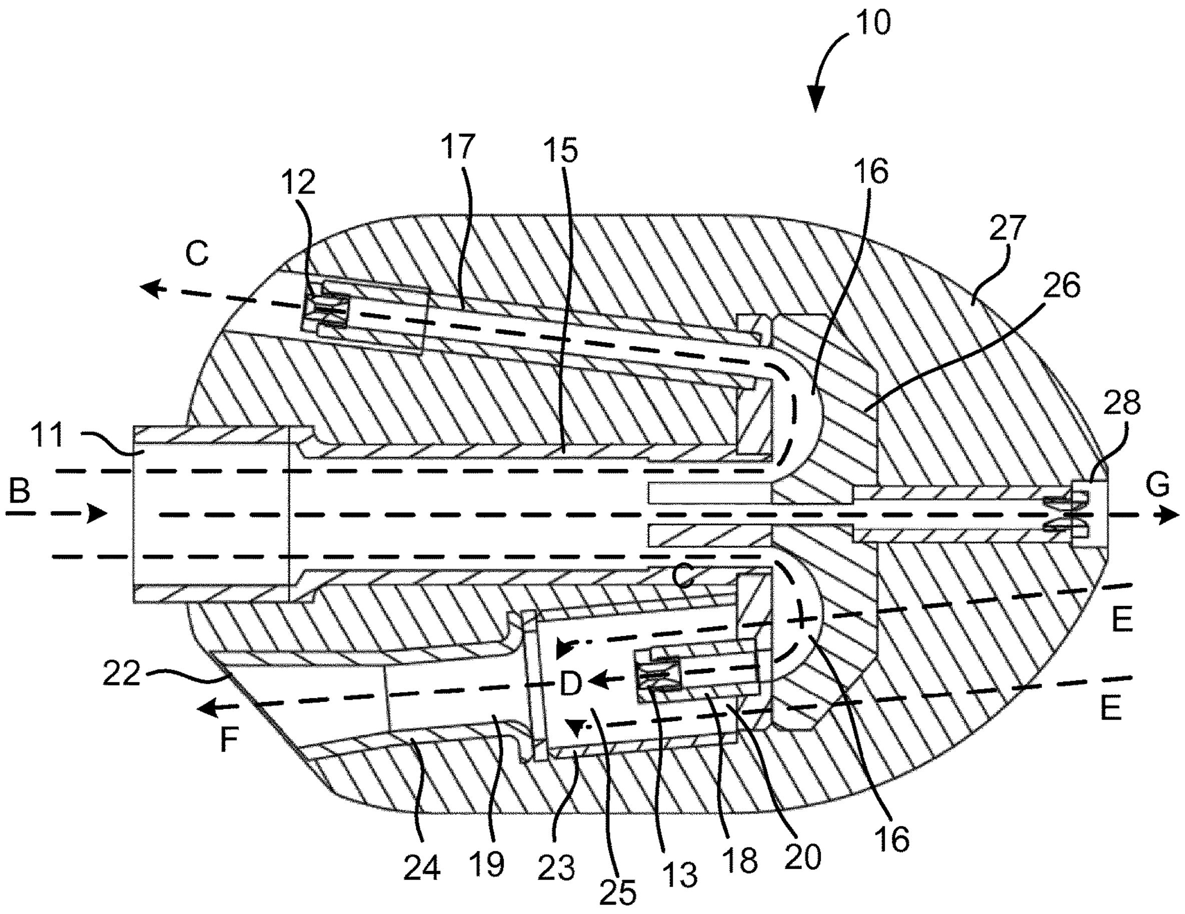
Figure 5:
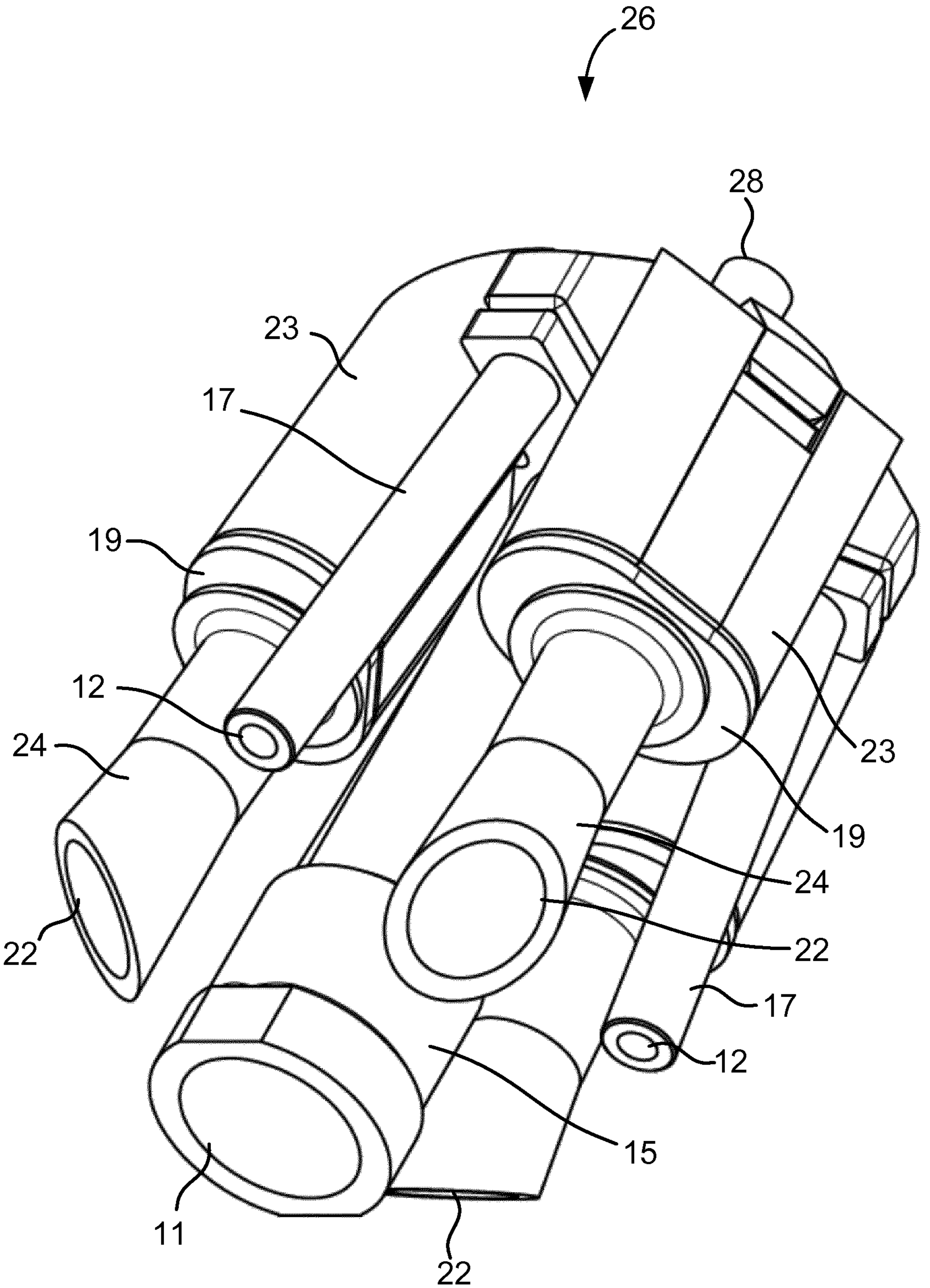
Figure 6:
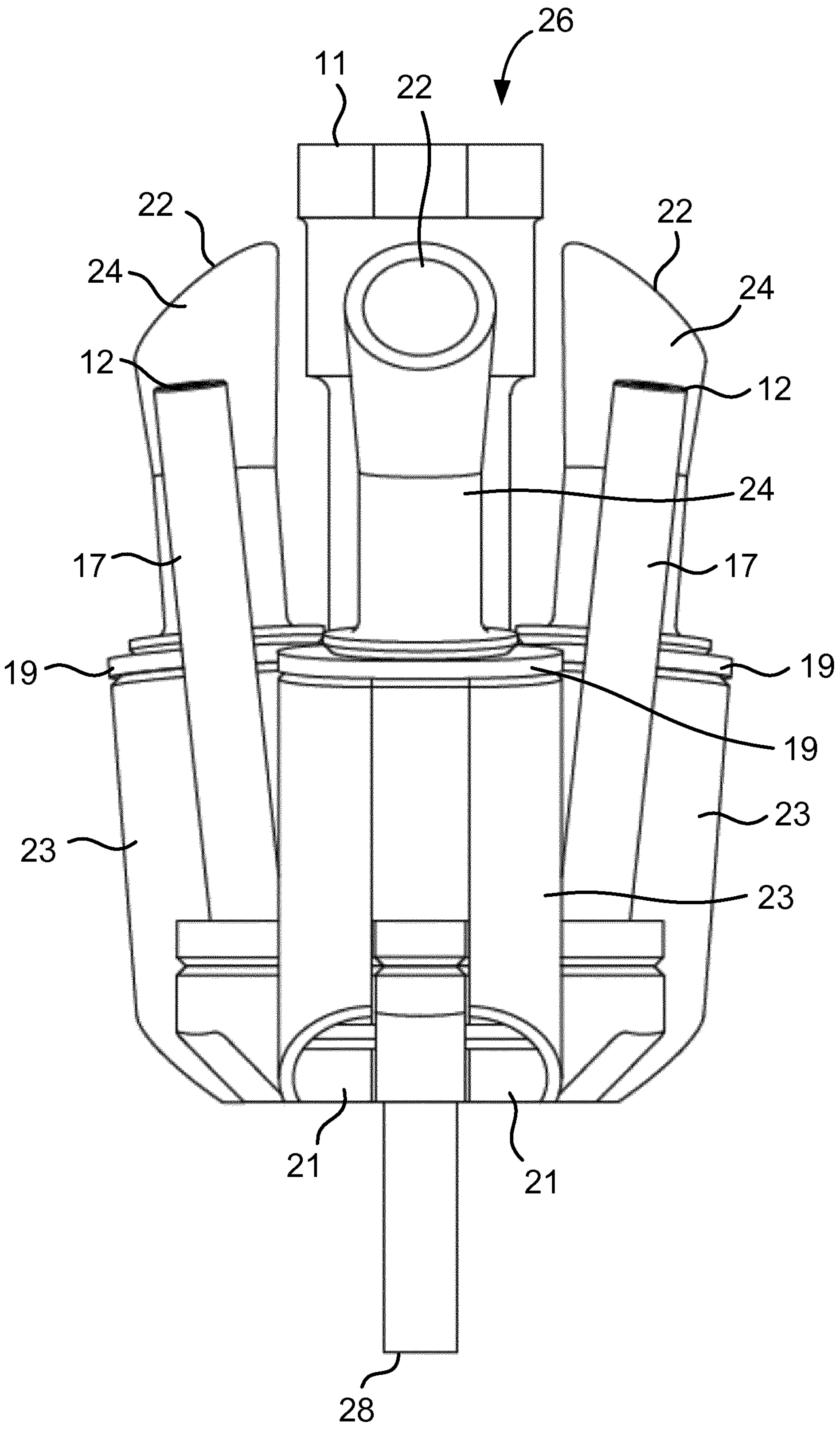
Figure 7:
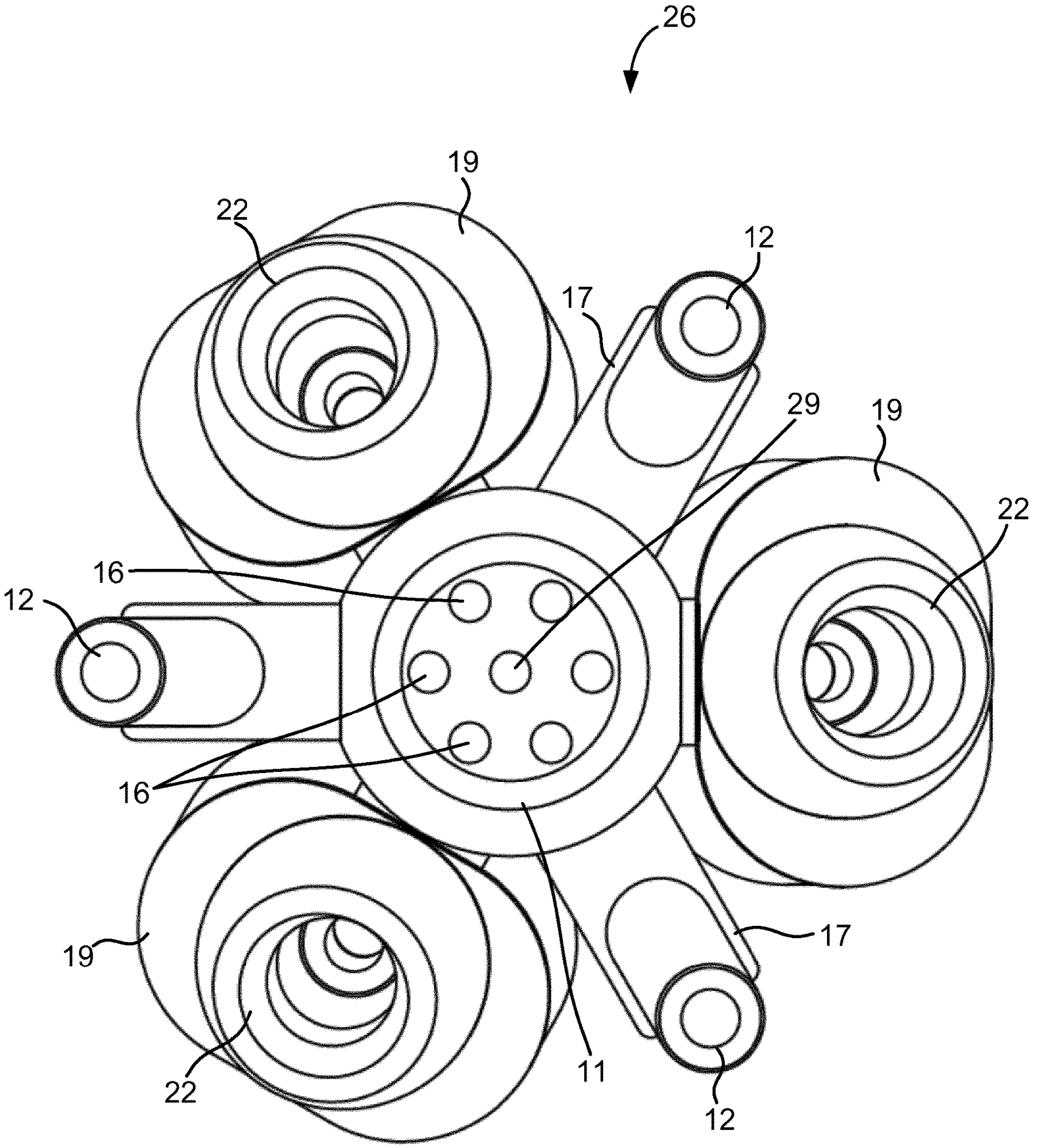
Figure 8:
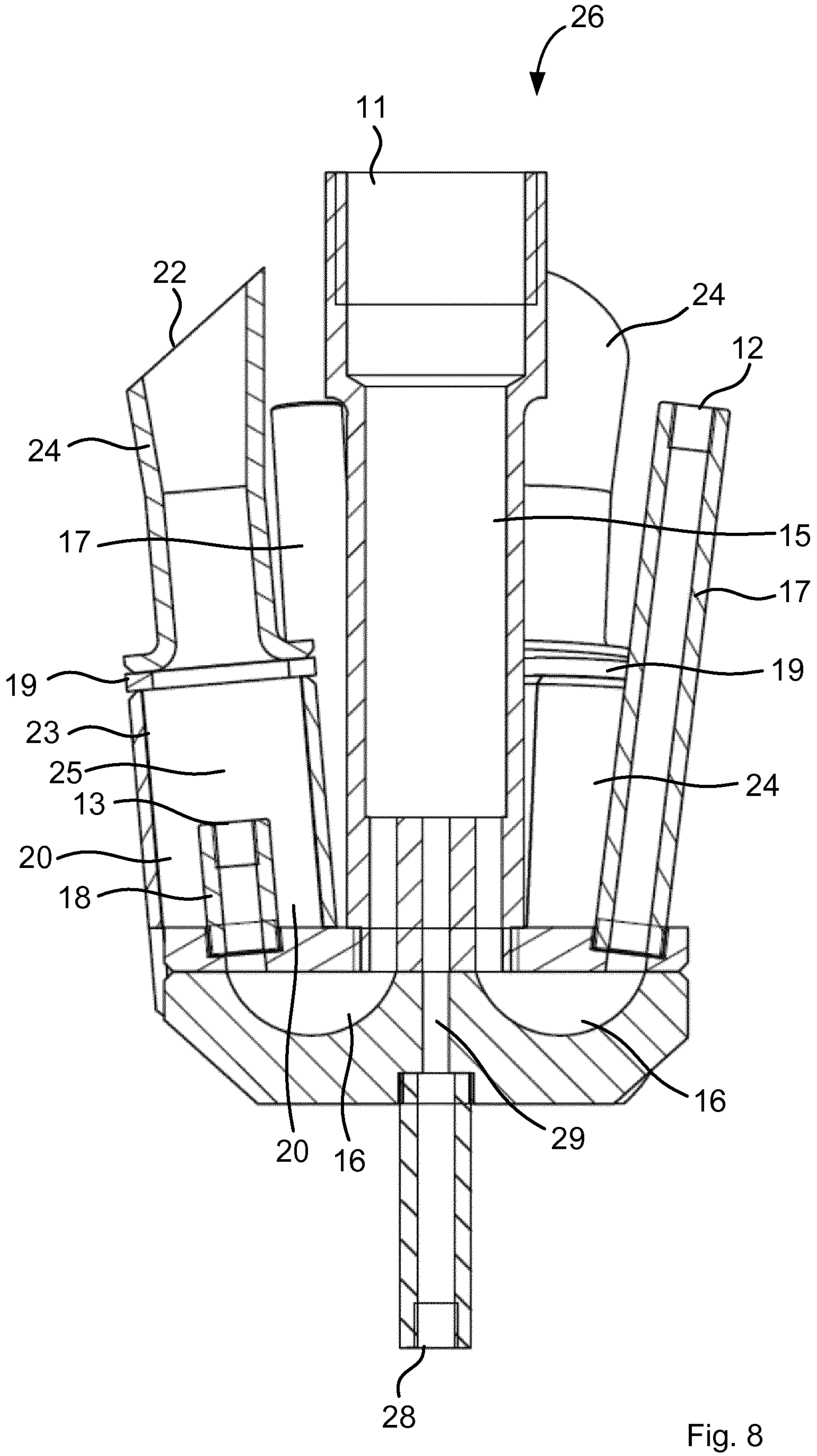

The invention will now be described more in detail with the aid of embodiment examples and with reference to the accompanying drawings, in which FIG. 1 is a schematic perspective view from a rear end of a nozzle for cleaning an interior of a pipe according to one embodiment, illustrating FIG. 2 is a schematic perspective view from a forward end of the nozzle of FIG. 1, FIG. 3 is a schematic longitudinal section view of the nozzle according to one embodiment, FIG. 4 is a schematic longitudinal section view of the nozzle according to one embodiment, illustrating different flow paths of the nozzle, FIG. 5 is a schematic perspective view from the rear end of an piping part of the nozzle according to one embodiment, wherein an exterior cover has been removed, FIG. 6 is a schematic side view of the piping part of the nozzle of FIG. 5, FIG. 7 is a schematic view from the rear end of the piping part of the nozzle according to FIG. 5, and FIG. 8 is a schematic longitudinal section view of the piping part of the nozzle according to FIG. 5.

THE INVENTION

With reference to FIGS. 1-3 a nozzle 10 for cleaning the interior of pipes is illustrated according to one embodiment of the invention. The nozzle 10 is arranged for cleaning pipes, such as pipes for surface water, storm water, waste water, sewage water, industrial waste water and similar. For example, the nozzle 10 is arranged for cleaning a pipe containing material, such as storm water, waste water, sewage water, industrial waste water and similar, which contains fluids, semi-fluid materials, or a mixture of fluid and solid substances and/or semi-fluid materials or solid material. The nozzle 10 is arranged for cleaning the pipe with a pressurised fluid, such as water, optionally heated or provided with detergents or similar. For example, the nozzle 10 is arranged to be connected to a fluid source, such as a water tank on a vehicle, through a hose and a pump, so that the nozzle 10 can be introduced in the pipe and clean the pipe by means of the pressurised fluid. The nozzle 10 is arranged to be driven along the pipe by means of the pressurised fluid while cleaning the interior of the pipe. For example, the nozzle 10 is a hydrodynamic nozzle adapted to be driven through material inside the pipe, if applicable.

The nozzle 10 comprises a rear end and a forward end. The forward end is the leading end of the nozzle 10 when it is driven by the pressurised fluid, wherein the rear end is the opposite end. The nozzle 10 also comprises a centre axis A, such as a longitudinal centre axis, which is indicated in FIG. 3 by means of a dot and dash line and extends between the forward end and the rear end of the nozzle 10.

The nozzle 10 comprises a rinsing fluid inlet 11 for a rinsing fluid, such as water. The rinsing fluid inlet 11 is arranged for introducing a rinsing fluid into the nozzle 10 in a forward direction. In the illustrated embodiment, the rinsing fluid inlet 11 is arranged in the rear end of the nozzle 10. In the illustrated embodiment, the nozzle 11 comprises a single rinsing fluid inlet. Alternatively, the nozzle 10 comprises a plurality of rinsing fluid inlets, e.g. arranged in parallel to each other. For example, the rinsing fluid inlet 11 is arranged centrally, i.e. coaxial to the centre axis A. The rinsing fluid inlet 11 is arranged to be connected to a hose (not illustrated) for supplying rinsing fluid to the nozzle 10 from a rinsing fluid source, such as a water tank or similar on a vehicle (not illustrated), e.g. by means of a pump for supplying the rinsing fluid at elevated pressure, such as 10-250 bar (1000-25000 kPa).

The rinsing fluid inlet 11 is connected to a plurality of rinsing fluid discharges 12 arranged radially outside the rinsing fluid inlet 11. The rinsing fluid discharges 12 are arranged for discharging rinsing fluid substantially in a backward direction, such as inclined radially outward and backward for driving the nozzle 10 in the forward direction and simultaneously rinse the interior of the pipe. For example, the rinsing fluid discharges 12 are arranged for discharging rinsing fluid at relatively high velocity for driving the nozzle 10 in the forward direction and clean the interior of the pipe also by mechanical force.

According to one embodiment, the rinsing fluid discharges 12 are arranged for outputting a jet of rinsing fluid. In the illustrated embodiment, the rinsing fluid discharges 12 are distributed around the rinsing fluid inlet 11. For example, the rinsing fluid discharges 12 are evenly distributed around the rinsing fluid inlet. Alternatively, the rinsing fluid discharges 12 are arranged in a common plane (not illustrated), such as a horizontal plane, wherein at least one rinsing fluid discharge 12 is arranged on each side of the rinsing fluid inlet 11. Alternatively, the rinsing fluid discharges 12 are arranged radially outside the rinsing fluid inlet 11 in any desired manner or pattern. The nozzle 10 comprises at least two rinsing fluid discharges 12, such as 2-10, 3-6, 4-6 or 3-5 rinsing fluid discharges 12.

The rinsing fluid inlet 11 is also connected to a plurality of rinsing fluid outlets 13, which are illustrated in FIG. 3. The rinsing fluid outlets 13 are arranged radially outside the rinsing fluid inlet 11. The rinsing fluid outlets 13 are arranged for discharging rinsing fluid substantially in a backward direction, such as inclined radially outward and backward. For example, the rinsing fluid outlets 13 are arranged for discharging rinsing fluid at relatively high velocity and thereby output a rinsing fluid jet or similar. In the illustrated embodiment, the rinsing fluid outlets are distributed around the rinsing fluid inlet 11. For example, the rinsing fluid outlets 13 are evenly distributed around the rinsing fluid inlet 11. Alternatively, the rinsing fluid outlets 13 are arranged in a common plane (not illustrated), such as a horizontal plane, wherein at least one rinsing fluid outlet 13 is arranged on each side of the rinsing fluid inlet 11. Alternatively, the rinsing fluid outlets 13 are radially outside the rinsing fluid inlet in any desired manner or pattern. The nozzle 10 comprises at least two rinsing fluid outlets 13, such as 2-10, 3-6, 4-6 or 3-5 rinsing fluid outlets 13. In the illustrated embodiment, the rinsing fluid outlets 13 and the rinsing fluid discharges 12 are arranged alternatingly, so that each of the rinsing fluid outlets 13 is arranged between two rinsing fluid discharges 12. Alternatively, the rinsing fluid outlets 13 and the rinsing fluid discharges 12 are grouped together in sets on each side of the rinsing fluid inlet 11.

As seen in FIG. 3 the rinsing fluid inlet 11 is connected to an inlet pipe portion 15. The inlet pipe portion 15 is arranged centrally and extends axially for conducting rinsing fluid in the forward direction inside the nozzle 10. The inlet pipe portion 15 connects the rinsing fluid inlet 11 with the rinsing fluid outlets 13 and the rinsing fluid discharges 12 through curved channels 16, wherein a flow of rinsing fluid is redirected from the forward direction in the inlet pipe portion 15 to a substantially backward and inclined backward direction by means of the curved channels 16. In FIG. 3 the rinsing fluid discharges 12 are connected to a nozzle tube 17, wherein each of the rinsing fluid outlets 13 are connected to a nozzle conduit 18, and wherein the nozzle tubes 17 and the nozzle conduits 18 are connected to the rinsing fluid inlet 11 through the inlet pipe portion 15.

Each of the rinsing fluid outlets 13 is enclosed by a tube 19 forming a passage 20 between the tube 19 and the rinsing fluid outlet 13. Hence, the rinsing fluid outlet 13 is arranged within the tube 19. Each of the tubes 19 is connected to a material suction inlet 21, which is illustrated particularly in FIGS. 1 and 2. In the illustrated embodiment, the material suction inlets 21 are arranged substantially in the forward end of the nozzle 10. The material suction inlets 21 are arranged for conducting material from the interior of the pipe, such as fluids, solid particles, and any other materials and mixtures thereof, and into the tube 19, passing the rinsing fluid outlet 13 in the passage 20. Hence, the material suction inlets 21 are in fluid communication with the tubes 19. In the illustrated embodiment, two material suction inlets 21 are connected to each tube 19, e.g. on opposite sides of the rinsing fluid outlet 13, the corresponding nozzle conduit 18 and the corresponding curved channel 16. Alternatively, a single material suction inlet 21 is connected to each tube 19. Alternatively, more than two material suction inlets 21 are connected to each tube 19, such as four or even more. Each tube 19 comprises a tube outlet 22 for discharging material and rinsing fluid. The tubes 19 comprise a first tube section 23 and a second tube section 24, wherein the rinsing fluid outlet 13 is arranged inside the first tube section 23 to form a chamber 25 inside the first tube section 23 where material is sucked in by rinsing fluid, wherein the second tube section 24 ends with the tube outlet 22. In the illustrated embodiment, the first tube section 23 is wider than the second tube section 24. As can be understood particularly from FIG. 1, the rinsing fluid discharges 12 and the tube outlets 22 are distributed around the rinsing fluid inlet 11 and are alternately arranged in the illustrated embodiment. For example, the tube outlets 22 and the rinsing fluid discharges 12 are arranged substantially at the same radial distance from the centre axis A of the nozzle 10, substantially forming a ring around the rinsing fluid inlet 11. Alternatively, the tube outlets 22 and the rinsing fluid discharges 12 are arranged at different radial distances from the centre axis A of the nozzle 10. Alternatively, the tube outlets 22 and the rinsing fluid discharges 12 are substantially arranged in a common plane, wherein centre axes of the tube outlets 22 and the rinsing fluid discharges 12 are arranged in a common plane. For example, centre axes of the nozzle tubes 17 and the tubes 19 are arranged in a common plane, such as a substantially horizontal plane when the nozzle 10 is in use. Alternatively, the tube outlets 22 and the rinsing fluid discharges 12 are arranged in in any desired pattern. According to the embodiment of FIG. 3, the rinsing fluid discharges 13 are axially displaced in relation to the rinsing fluid outlets 12. For example, the nozzle tubes 17 are longer than the nozzle conduits 18.

In the illustrated embodiment, the nozzle 10 comprises an piping part 26 and a cover 27 enclosing the piping part 26. In the illustrated embodiment, the piping part 26 is an interior piping part. Alternatively, one or more portions of the piping part is/are not covered by the cover 27. The piping part includes inlet pipe portion 15, the nozzle tubes 17, the nozzle conduits 18, the curved channels 16 and the tubes 19, which are illustrated more in detail in FIGS. 5-8. In the embodiment of FIGS. 1-4, the cover 27 is arranged for enclosing the interior piping part 26 and provide a more hydrodynamic form to the nozzle 10. In the illustrated embodiment, the forward portion of the cover 27 is rounded. For example, the cover 27 is formed with a substantially smooth surface. For example, the cover 27 is formed in a plastic material. Alternatively, the cover 27 is formed in a composite material, fiber composite material or metal. For example, the piping part 26 is formed in metal, such as stainless steel. Alternatively, the piping part 26 is formed in a fiber composite material or a durable and abrasive resistant polymer material.

With reference particularly to FIGS. 2-4 the nozzle 10 includes an optional forward rinsing fluid discharge 28 for discharging rinsing fluid in the forward direction. The forward rinsing fluid discharge 28 is connected to the rinsing fluid inlet 11, e.g. through the inlet pipe portion 15 and a straight channel 29. In the illustrated embodiment, the forward rinsing fluid discharge 28 is arranged centrally and coaxial with the central axis A. For example, the forward rinsing fluid discharge 28 is arranged for discharging less rinsing fluid than the substantially backward directed rinsing fluid discharges 12 and the rinsing fluid outlets 13 together, so that the nozzle 10 is driven forward by the output of rinsing fluid through the rinsing fluid discharges 12 and the rinsing fluid outlets 13.

With reference to FIG. 4 the function of the nozzle 10 is explained schematically. The different fluid flows of the nozzle 10 are depicted schematically by means of arrows in FIG. 4. The rinsing fluid is introduced into the nozzle 10 through the rinsing fluid inlet 11 in a direction forward as indicated by means of the arrow B. In the illustrated embodiment, the rinsing fluid is introduced into the rinsing fluid inlet 11 at the rear end of the nozzle 10 and conducted substantially axially in the forward direction through the inlet pipe portion 15 and towards the curved channels 16. Hence, the flow of rinsing fluid introduced through the rinsing fluid inlet 11 is divided into a plurality of separate flow portions. A first set of flow portions is conducted to the rinsing fluid discharges 12 through the curved channels 16 and the nozzle tubes 17, which is illustrated by means of the arrow C. Hence, the rinsing fluid is redirected from the forward direction inside the inlet pipe portion 15 to a substantially backward direction or inclined backward and outward direction to propel the nozzle 10 forward inside the pipe. At the same time the rinsing fluid discharged backward can, depending on the angle of the discharged rinsing fluid, clean the inside walls of the pipe and transport material from the inside of the pipe backward. Also, the material inside the pipe can be mixed with the rinsing fluid to facilitate transport thereof, such as by rinsing, or removal thereof, such by pumping, e.g. to a tank or container (not illustrated) for collecting used rinsing fluid and material from the inside of the pipe after cleaning. It is understood that the angle and velocity of discharge of rinsing fluid through the rinsing fluid outlets 12 are balanced for favourable cleaning of the pipe while propelling the nozzle 10 forward. For example, the rinsing fluid outlets 12 are arranged for discharging rinsing fluid at an angle of 120-190 degrees in relation to the axially incoming rinsing fluid through the inlet pipe portion 15. For example, said angle is 140-190 degrees, 150-180 degrees, such as 165-175 degrees.

A second set of flow portions is conducted to the rinsing fluid outlets 13 through the curved channels 16 and the nozzle conduits 18, which is illustrated by means of the arrow D in FIG. 4. Hence, the rinsing fluid is redirected by the curved channels 16 from the forward direction inside the inlet pipe portion 15 to a substantially backward direction or inclined backward and outward direction before it is conducted out from the rinsing fluid outlets 13. The flow of rinsing fluid out from the rinsing fluid outlets 13 sucks a flow of material into the tubes 19 through the material suction inlets 21, which is illustrated by means of the arrows E. Hence, material, such as fluids, waste etc., in front of the nozzle 10 is sucked into the tubes 19 through the material suction inlets 21 and conducted to the chambers 25 at the rinsing fluid outlets 13 by means of the passages 20, wherein the material is sucked in by the rinsing fluid discharged from the rinsing fluid outlets 13 and then the material and rinsing fluid, which may or may not be mixed, is/are conducted out from the tube through the tube outlets 22, which is illustrated by means of the arrow Fin FIG. 4. Hence, the combination of the tube 19, the material suction inlet 21 and the rinsing fluid outlet 13 forms an ejector, wherein a plurality of ejectors are distributed radially outside of the rinsing fluid inlet. The tube outlets 22 are arranged to discharge the material and rinsing fluid in a direction substantially backward or inclined backward and outward. Hence, also the discharged material and rinsing fluid will, at least to some extent, contribute to propelling the nozzle 10 forward and transport material inside the pipe in the backward direction. For example, the tube outlets 22 are arranged for discharging rinsing fluid at an angle of 140-180 degrees, 150-180 degrees or 165-175 degrees in relation to the axially incoming rinsing fluid through the inlet pipe portion 15.

In the illustrated embodiment, one flow portion is conducted into the optional forward fluid discharge 28 through the straight channel 29 connecting the inlet pipe portion 15 and the forward fluid discharge 28 to discharge rinsing fluid in the forward direction, which is illustrated by means of the arrow G in FIG. 4. For example, the forward fluid discharge 28 is arranged to discharge a jet of rinsing fluid to process material in front of the nozzle 10 mechanically and mix material with the rinsing fluid for cleaning purposes and to facilitate for such material to be sucked into the material suction inlets 21.

With reference to FIGS. 5-8 the piping part 26 of the nozzle 10 is illustrated according to one embodiment, wherein the exterior cover 27 has been removed. The piping part 26 comprises the rinsing fluid inlet 11, the inlet pipe portion 15, the curved channels 16, the nozzle tubes 17, the nozzle conduits 18, the rinsing fluid discharges 12, the rinsing fluid outlets 13, the tubes 19, the chambers 25, the tube outlets 22, the optional forward rinsing fluid discharge 28 and the straight channel 29. In the illustrated embodiment, the piping part 26 comprises a single rinsing fluid inlet 11 and a single inlet pipe portion 15 leading to a plurality of curved channels 16 and the straight channel 29 as illustrated particularly in FIG. 7. Alternatively, the piping part 26 comprises a plurality of rinsing fluid inlets and/or a plurality of inlet pipe portions leading to the curved channels 16 and optionally to the straight channel 29. Also, in the illustrated embodiment, the piping part 26 comprises six curved channels 16. Hence, the piping part 26 comprises three nozzle tubes 17 each terminated with a rinsing fluid discharge 12, and three nozzle conduits 18 each terminated with a rinsing fluid outlet 13, wherein the nozzle tubes 17 and the nozzle conduits 18 are arranged alternatingly around the inlet pipe portion 15. However, alternatively the piping part 26 comprises at least four curved channels 16, such as at least six or eight or even more curved channels 16. For example, the curved channels 16 alternatingly lead to nozzle tubes 17 and nozzle conduits 18. In the illustrated embodiment the piping part 26 comprises a single straight channel 29 leading to a single forward rinsing fluid discharge 28. Alternatively, the piping part 26 comprises a plurality of forward rinsing fluid discharges or a plurality of straight channels leading to a plurality of forward rinsing fluid discharges. Alternatively, the nozzle 10 does not comprise any forward rinsing fluid discharge 28.

With reference particularly to FIG. 8 the nozzle tubes 17 is longer than the nozzle conduits, wherein the rinsing fluid discharges 12 are axially displaced backward in relation to the rinsing fluid outlets 13. For example, the nozzle tubes 17 are at least twice as long as the nozzle conduits 18, such as at least three times or four times as long. For example, the tubes 19 are arranged with a length corresponding to or longer than the length of the nozzle tubes 17.

The nozzle 10 according to the present invention is, e.g. part of a system for cleaning pipes, such as storm water pipes, waste water pipes, sewage pipes and similar, wherein the system further comprises a rinsing fluid source, a pump and a hose connecting the nozzle 10 and the rinsing fluid source, wherein the nozzle is connected to the water source through the hose and the pump for cleaning the pipe by means of pressurized rinsing fluid. For example, the rinsing fluid source is a mobile tank. For example, the system includes vehicle with the rinsing fluid source, the pump, the hose and the nozzle 10. Optionally, said vehicle also comprises a tank or container for collecting fluid and material after cleaning of the pipe.

A cleaning operation using the nozzle 10 as described above includes the steps of introducing the nozzle 10 in a pipe to be cleaned. wherein the nozzle 10 is connected to a rinsing fluid source through a hose and a pump for providing pressurized rinsing fluid, such as water, to the nozzle 10 inside the pipe. The nozzle 10 is positioned inside the pipe with the rinsing fluid inlet 11, the rinsing fluid discharges 12 and the tube outlets 22 in a backward direction, so that the nozzle 10 is driven in a forward direction by the action of the rinsing fluid exiting the nozzle 10. For example, the nozzle 10 is entirely or at least partially immersed in fluid and/or material inside the pipe. Hence, the nozzle 10 is propelled forward by the force of rinsing fluid jets exiting the rising fluid discharges 12 and the rinsing fluid outlets 13. Hence, the rinsing fluid inlet 11 is directed backward, so that rinsing fluid is introduced into the nozzle 10 in the forward direction, wherein the incoming flow of rinsing fluid is divided into the curved channels 16 and further into the nozzle tubes 17 and nozzle conduits 18, respectively, and further out through the rinsing fluid discharges 12 and the rinsing fluid outlets 13. While the nozzle 10 is being propelled forward inside the pipe it rinses and cleans the interior of the pipe by means of the rinsing fluid jets exiting the rinsing fluid discharges 12. Simultaneously, material in front of the nozzle 10 is sucked into the material suction inlets 21 and inside the chambers 25 by the rinsing fluid, wherein the material and rinsing fluid is discharged through the tube outlets 22. Optionally, a flow of rinsing fluid, such as a jet or spray, is also directed forward through the forward rinsing fluid discharge 28. Optionally, fluid and material behind the nozzle 10 is collected, such as by means of a hose and a pump, and conducted to a tank or container for further processing. In some cases the pipe is cleaned by means of the nozzle 10 also when the nozzle 10 is pulled back through the pipe.

According to one embodiment, the rinsing fluid discharges 12, the nozzle tubes 17 or the curved channels 16 leading to the nozzle tubes 17 can be temporarily blocked, wherein the cleaning is performed only by the material and rinsing fluid exiting the tube outlets 22 to achieve a more gentle cleaning of the pipe. Alternatively or in addition, the material suction inlets 21, the nozzle conduits 18 or the curved channels 16 leading to the nozzle conduits 18 can be temporarily blocked.

The invention claimed is:

1. A nozzle for cleaning the interior of a pipe, comprising:
a nozzle body comprising:
a rinsing fluid inlet to supply a rinsing fluid in a forward direction;
a rinsing fluid outlet connected to the rinsing fluid inlet and that discharges a jet of rinsing fluid at least partially in a rearward direction; and
a suction tube forming a passage between a material suction inlet arranged in a forward end of the nozzle body and a tube outlet,
wherein the rinsing fluid outlet is disposed in the suction tube,
wherein the flow of rinsing fluid out of the rinsing fluid outlet sucks material from the interior of the pipe into the material suction inlet, and wherein the tube outlet discharges a mixture of the material and rinsing fluid from the nozzle body in at least partially the rearward direction.

2. The nozzle of claim 1, wherein the suction tube comprises a first tube section being wider than a second tube section, wherein the rinsing fluid outlet is arranged inside the first tube section to form a chamber inside the first tube section for material and rinsing fluid.

3. The nozzle of claim 2, wherein the second tube section extends from the first tube section to the tube outlet disposed on a rear surface of the nozzle body.

4. The nozzle of claim 1, wherein the rinsing fluid outlet is disposed between the material suction inlet and the tube outlet in the suction tube.

5. The nozzle of claim 1, further comprising at least two rinsing fluid discharges connected to the rinsing fluid inlet and that discharge the rinsing fluid from the nozzle body at least partially in the rearward direction, wherein the rinsing fluid discharges are not disposed in the suction tube.

6. The nozzle of claim 5, wherein the rinsing fluid discharges and the tube outlet is arranged evenly about the rinsing fluid inlet.

7. The nozzle of claim 6, wherein the rinsing fluid discharges and the tube outlet is alternately arranged about the rinsing fluid inlet in at least one of a radial configuration or a planar configuration.

8. The nozzle of claim 5, wherein each of the rinsing fluid outlet and the rinsing fluid discharges are connected to the rinsing fluid inlet through a curved channel.

9. The nozzle of claim 8, wherein the curved channels are curved 120-190 degrees.

10. The nozzle of claim 8, wherein a first curved channel connected to the rinsing fluid discharge is longer than a second curved channel connected to the rinsing fluid outlet.

11. The nozzle of claim 1, comprising a forward rinsing fluid discharge for discharging rinsing fluid in the forward direction, wherein the forward rinsing fluid discharge is connected to the fluid inlet, wherein the forward rinsing fluid discharge is coaxial to a central axis of the nozzle.

12. A system for cleaning the interior of a pipe, comprising a fluid source, a hose, a pump and a nozzle according to claim 1, wherein the nozzle is connected to the fluid source through the hose and the pump, wherein the pump pressurizes the fluid for cleaning the pipe by with a pressurized rinsing fluid.

13. A nozzle for cleaning the interior of a pipe, comprising:
a nozzle body comprising:
a rinsing fluid inlet positioned on a rear surface of the nozzle body and adapted to be connected to a hose to supply a rinsing fluid in a forward direction;
a suction tube forming a passage between a material suction inlet disposed on a forward surface of the nozzle body and a tube outlet, wherein the material suction inlet and is wider than the tube outlet,
a fluid outlet connected to the rinsing fluid inlet and disposed in the suction tube between the material suction inlet and the tube outlet, wherein the fluid outlet supplies a jet of rinsing fluid into the suction tube in at least partially rearward direction that causes material from the interior of the pipe to be sucked into the material suction inlet and through the suction tube,
wherein the tube outlet discharges a mixture of the material and rinsing fluid from the nozzle body.

14. The nozzle of claim 13, wherein the suction tube comprises a first tube section adjacent the inlet being wider than a second tube section wherein the second tube section ends with the tube outlet, wherein the rinsing fluid outlet is arranged inside the first tube section to form a chamber inside the first tube section for material and rinsing fluid.

15. The nozzle of claim 14, wherein the second tube section extends from the first tube section to the tube outlet disposed on the rear surface of the nozzle body.

16. The nozzle of claim 13, further comprising at least two fluid discharges connected to the rinsing fluid inlet and that discharge the rinsing fluid from the nozzle body at least partially in a rearward direction, wherein the fluid discharges are not positioned in the suction tube.

17. The nozzle of claim 13, comprising a forward rinsing fluid discharge for discharging rinsing fluid in the forward direction, wherein the forward rinsing fluid discharge is connected to the rinsing fluid inlet, wherein the forward rinsing fluid discharge is coaxial to a central axis of the nozzle.

* * * * *